United States Patent
Huang et al.

(10) Patent No.: US 12,418,184 B2
(45) Date of Patent: Sep. 16, 2025

(54) METHOD FOR MANAGING CHARGING IN A BATTERY SWAPPING STATION, BATTERY SWAPPING CABINET AND SYSTEM

(71) Applicant: CONTEMPORARY AMPEREX TECHNOLOGY (HONG KONG) LIMITED, Hong Kong (CN)

(72) Inventors: Zhenhui Huang, Ningde (CN); Hang Ma, Ningde (CN); Yongchao Li, Ningde (CN)

(73) Assignee: CONTEMPORARY AMPEREX TECHNOLOGY (HONG KONG) LIMITED, Hong Kong (CN)

( * ) Notice: Subject to any disclaimer, the term of this patent is extended or adjusted under 35 U.S.C. 154(b) by 584 days.

(21) Appl. No.: 17/564,258

(22) Filed: Dec. 29, 2021

(65) Prior Publication Data
US 2023/0064624 A1   Mar. 2, 2023

Related U.S. Application Data

(63) Continuation of application No. PCT/CN2021/115747, filed on Aug. 31, 2021.

(51) Int. Cl.
*B60L 53/60* (2019.01)
*B60L 53/80* (2019.01)
*H02J 7/00* (2006.01)

(52) U.S. Cl.
CPC .......... *H02J 7/00036* (2020.01); *B60L 53/60* (2019.02); *B60L 53/80* (2019.02); *H02J 7/0013* (2013.01);
(Continued)

(58) Field of Classification Search
CPC .. H02J 7/00036; H02J 7/0049; H02J 7/00712; H02J 7/0013; H02J 7/0029; B60L 53/60; B60L 53/80
See application file for complete search history.

(56) References Cited

U.S. PATENT DOCUMENTS 3,938,019 A * 2/1976 Schmitt ............. H02J 7/007182
320/139
5,945,811 A * 8/1999 Hasegawa ............. H02J 7/0013
320/141
(Continued)

FOREIGN PATENT DOCUMENTS

CN     106992563 A     7/2017
CN     111319509 A     6/2020
(Continued)

OTHER PUBLICATIONS

Machine translation of WO-2019100659-A1. (Year: 2019).*
(Continued)

*Primary Examiner* — Julian D Huffman
*Assistant Examiner* — Pamela J Jeppson
(74) *Attorney, Agent, or Firm* — K&L Gates LLP

(57) ABSTRACT

The present application provides a method for managing charging in a battery swapping station. The method includes: receiving, by the first management unit, a wireless communication connection instruction transmitted by a management device of the battery swapping station, wherein the connection instruction includes a network location address of a second management unit of a battery pack; initiating, by the first management unit, a wireless communication connection to the second management unit based on the network location address; uploading, by the first management unit, battery status information of the battery pack acquired from the second management unit to the management device; and under a condition that the first management unit receives a charging instruction transmitted by the management device based on the battery status information, controlling, by the first management unit via an interaction with the second management unit and the charging unit, the charging unit to charge the battery pack.

14 Claims, 5 Drawing Sheets

(52) U.S. Cl.
CPC .......... *H02J 7/0029* (2013.01); *H02J 7/0049* (2020.01); *H02J 7/00712* (2020.01)

(56) References Cited

U.S. PATENT DOCUMENTS

| | | | | |
|---|---|---|---|---|
| 5,963,012 | A * | 10/1999 | Garcia | H02J 50/10 320/108 |
| 2006/0076921 | A1* | 4/2006 | Kubota | H02J 7/00714 320/107 |
| 2010/0114800 | A1* | 5/2010 | Yasuda | H04L 41/00 429/163 |
| 2013/0069594 | A1* | 3/2013 | Jung | H01M 10/425 320/112 |
| 2016/0101705 | A1* | 4/2016 | Kuraishi | G06Q 10/06 320/109 |
| 2020/0391602 | A1* | 12/2020 | Ikui | H01M 10/48 |
| 2021/0001744 | A1* | 1/2021 | Suzuki | B60L 55/00 |

FOREIGN PATENT DOCUMENTS

| | | |
|---|---|---|
| CN | 111559271 A | 8/2020 |
| CN | 113246798 A | 8/2021 |
| EP | 3855550 A1 | 7/2021 |
| JP | 2020004417 A | 1/2020 |
| KR | 20120134174 A | 12/2012 |
| WO | 2013080211 A1 | 6/2013 |
| WO | 2017207996 A1 | 12/2017 |
| WO | WO-2019100659 A1 * 5/2019 .............. B60L 53/80 |
| WO | 2019163681 A1 | 8/2019 |
| WO | 2020059833 A1 | 3/2020 |

OTHER PUBLICATIONS

The extended European search report for European Application No. 21820438.6, dated Jun. 23, 2023, 11 pages.
The First Office Action for KR Application No. 10-2021-7034429, dated Aug. 17, 2023, 8 pages.
The First Office Action for JP Application No. 2021-558712, dated Oct. 17, 2023, 6 pages.
The International search report for PCT Application No. PCT/CN2021/115747, dated May 9, 2022, 10 pages.

* cited by examiner

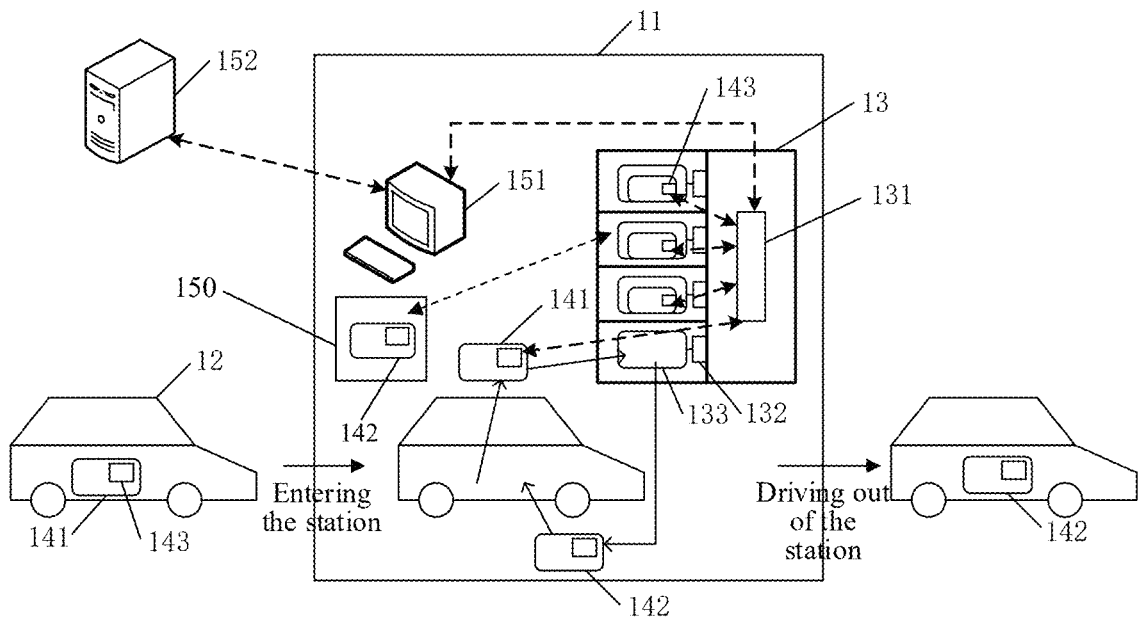

Fig. 1

| Receiving, by the first management unit, a wireless communication connection instruction transmitted by a management device of the battery swapping station | S201 |

↓

| Initiating, by the first management unit, a wireless communication connection to the second management unit based on the network location address of the second management unit | S202 |

↓

| Uploading, by the first management unit, battery status information of the battery pack acquired from the second management unit to the management device | S203 |

↓

| Under a condition that the first management unit receives a charging instruction transmitted by the management device based on the battery status information, controlling, by the first management unit via an interaction with the second management unit and the charging unit, the charging unit to charge the battery pack | S204 |

Fig. 2

METHOD FOR MANAGING CHARGING IN A BATTERY SWAPPING STATION, BATTERY SWAPPING CABINET AND SYSTEM

CROSS-REFERENCE TO RELATED APPLICATION

The present application is a continuation of International Application No. PCT/CN2021/115747, filed on Aug. 31, 2021, which is incorporated herein by reference in its entirety.

TECHNICAL FIELD

The present application relates to the technical field of batteries, and in particular, to a method for managing charging in a battery swapping station, a battery swapping cabinet and a system.

BACKGROUND

With the development of new energy technology, application fields of batteries have become more and more extensive. For example, a battery may be used as a power source to supply power for a vehicle, which reduces the use of non-renewable resources.

Under a condition that the power of a battery in a vehicle is not enough to support the vehicle to continue driving, a charging device such as a charging pile may be used to charge the vehicle, that is, to charge the battery in the vehicle, to realize a charge and discharge cycle use of the battery. However, it takes a long time to charge the battery, which limits the endurance of the vehicle.

In order to improve an endurance utilization rate of a vehicle, battery swapping technology has emerged as the times require. A vehicle may realize a rapid endurance of the vehicle by replacing a battery with insufficient power with a battery with sufficient power in a battery swapping station. The battery with insufficient power may be charged in the battery swapping station, and the charged battery may be used as a replacement battery for a vehicle that subsequently enters the battery swapping station for battery swapping. However, some operations of battery charging management in a battery swapping cabinet require manual participation, such as manually selecting a battery compartment that needs to be charged, manually triggering charging of a battery compartment, etc. The efficiency of battery charging management in the battery swapping station still needs to be improved.

SUMMARY

Embodiments of the present application provide a method for managing charging in a battery swapping station, a battery swapping cabinet and a system.

In a first aspect, the embodiments of the present application provide a method for managing charging in a battery swapping station, applied to a battery swapping cabinet in the battery swapping station, wherein the battery swapping cabinet includes a first management unit and a charging unit, the first management unit has a wireless communication function, and the method includes: receiving, by the first management unit, a wireless communication connection instruction transmitted by a management device of the battery swapping station, wherein the wireless communication connection instruction comprises a network location address of a second management unit of a battery pack; initiating, by the first management unit, a wireless communication connection to the second management unit based on the network location address of the second management unit; uploading, by the first management unit, battery status information of the battery pack acquired from the second management unit to the management device; and under a condition that the first management unit receives a charging instruction transmitted by the management device based on the battery status information, controlling, by the first management unit via an interaction with the second management unit and the charging unit, the charging unit to charge the battery pack.

In a second aspect, the embodiments of the present application provide a battery swapping cabinet including: a first management unit having a wireless communication function and configured to: under a condition that a battery pack enters the battery swapping cabinet, receive a wireless communication connection instruction transmitted by a management device in a battery swapping station, wherein the wireless communication connection instruction comprises a network location address of a second management unit of the battery pack; initiate a wireless communication connection to the second management unit based on the network location address of the second management unit; upload battery status information of the battery pack acquired from the second management unit to the management device; and under a condition that a charging instruction transmitted by the management device based on the battery status information is received, control the charging unit to charge the battery pack, via an interaction with the second management unit and the charging unit; and a charging unit configured to interact with the second management unit through the first management unit to charge the battery pack.

In a third aspect, the embodiments of the present application provide a system for managing charging in a battery swapping station, including a management device, a battery swapping cabinet and a second management unit, wherein the battery swapping cabinet comprises a first management unit and a charging unit, wherein the management device is arranged to correspond to the battery swapping station, and is configured to: under a condition that a battery pack enters the battery swapping cabinet, transmit a wireless communication connection instruction to the first management unit, wherein the wireless communication connection instruction comprises a network location address of the second management unit; the first management unit is configured to receive the wireless communication connection instruction, and initiate a wireless communication connection to the second management unit based on the network location address of the second management unit; the second management unit is configured to transmit battery status information of the battery pack to the first management unit; the first management unit is further configured to upload the battery status information to the management device; the management device is further configured to transmit a charging instruction to the first management unit based on the battery status information; the first management unit is further configured to: under a condition that the charging instruction is received, control the charging unit to charge the battery pack, via an interaction with the second management unit and the charging unit; and the charging unit is configured to interact with the second management unit through the first management unit to charge the battery pack.

BRIEF DESCRIPTION OF THE DRAWINGS

In order to more clearly describe technical solutions of the embodiments of the present application, the drawings that need to be used in the embodiments of the present application will be briefly introduced below. Obviously, the drawings described below are only some embodiments of the present application. For those of ordinary skill in the art, without creative work, other drawings can be obtained based on the drawings.

FIG. 1 is a schematic diagram of an example of an application scenario of a method for managing charging in a battery swapping station provided by an embodiment of the present application;

FIG. 2 is a flowchart of an embodiment of a method for managing charging in a battery swapping station provided by the present application;

DETAILED DESCRIPTION

Figure 3:
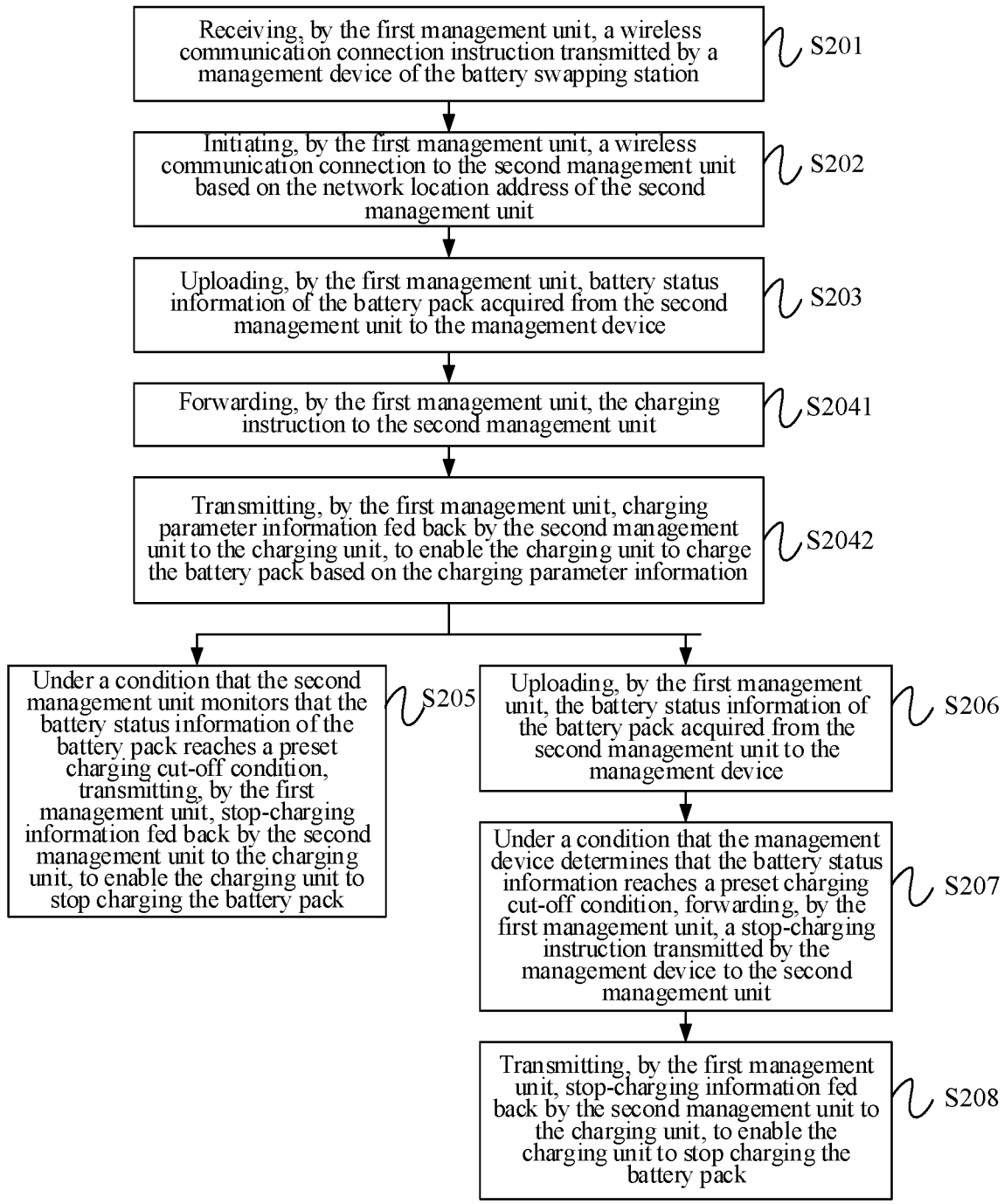
FIG. 3 is a flowchart of another embodiment of a method for managing charging in a battery swapping station provided by the present application.

The implementation of the present application will be described in further detail below in conjunction with the drawings and embodiments. The detailed description and drawings of the following embodiments are used to exemplarily illustrate the principle of the present application, but cannot be used to limit the scope of the present application, that is, the present application is not limited to the described embodiments.

In the description of the present application, it should be noted that, unless otherwise stated, "a plurality" means two or more; an orientation or positional relationship indicated by the terms "upper", "lower", "left", "right", "inside" and "outside" is only for the convenience of describing the present application and simplifying the description, rather than indicating or implying that the referred apparatus or element must have a specific orientation, be constructed and operated in a specific orientation, and therefore cannot be understood as a limitation of the present application. In addition, the terms "first", "second", "third", etc. are merely used for descriptive purposes, and cannot be understood as indicating or implying relative importance. "Vertical" is not strictly vertical, but within an allowable range of error. "Parallel" is not strictly parallel, but within an allowable range of error.

The words of orientation appearing in the following description are all directions shown in the figures, and do not limit the specific structure of the present application. In the description of the present application, it should also be noted that, unless otherwise clearly specified and limited, the terms "installing", "coupling", and "connecting" should be understood in a broad sense, for example, it can be a fixed connection, a detachable connection, or an integral connection; it can be directly connected, or indirectly connected through an intermediate medium. For those of ordinary skill in the art, the specific meanings of the above-mentioned terms in the present application can be understood according to specific circumstances.

With the development of new energy technology, application fields of batteries have become more and more extensive. For example, a battery may be used as a power source to supply power for a vehicle, which reduces the use of non-renewable resources. Under a condition that the power of a battery in a vehicle is not enough to support the vehicle to continue driving, a charging device such as a charging pile may be used to charge the vehicle, that is, to charge the battery in the vehicle, to realize a charge and discharge cycle use of the battery. However, it takes a long time to charge the battery, which limits the endurance of the vehicle.

In order to improve an endurance utilization rate of a vehicle, battery swapping technology has emerged as the times require. The battery swapping technology adopts a manner of "separation of vehicle and electricity", and can provide a battery replacement service for a vehicle through a battery swapping station, that is, a battery can be quickly removed from or installed to the vehicle. The battery removed from the vehicle can be put into the battery swapping cabinet of the battery swapping station for charging, to prepare for battery swapping of a vehicle that subsequently enters the battery swapping station. However, at this stage, the charging management of the battery entering the battery swapping cabinet requires some manual operations, such as manually selecting a battery compartment that needs to be charged, manually triggering a battery compartment to charge a battery, etc. The efficiency of battery charging management in the battery swapping station still needs to be improved.

The embodiments of the present application can provide a method for managing charging in a battery swapping station, a battery swapping cabinet and a system. The battery swapping cabinet can establish a wireless communication connection with a management unit of a battery pack, and acquire battery status information from the management unit of the battery pack to upload to a management device of the battery swapping station, to charge a battery under the instruction of the management device. The charging management of the battery in the battery swapping cabinet of the battery swapping station does not require manual operation, which improves the efficiency of battery charging management in the battery swapping station.

In order to facilitate understanding, an application scenario of a method for managing charging in a battery swapping station provided by the embodiments of the present application will be described, as an example, below first. FIG. 1 is a schematic diagram of an example of an application scenario of a method for managing charging in a battery swapping station provided by an embodiment of the application. As shown in FIG. 1, a method for managing charging in a battery swapping station may involve a battery swapping station 11, a vehicle 12, and a battery.

The battery swapping station 11 may refer to a place that provides a battery swapping service for a vehicle. For example, the battery swapping station 11 may be a fixed place, or the battery swapping station 11 may be a movable place such as a mobile battery-swapping vehicle, which is not limited herein.

In the embodiments of the present application, as shown in FIG. 1, a battery swapping cabinet 13 may be arranged in the battery swapping station 11. The battery swapping cabinet 13 includes a first management unit 131 and a charging unit(s) 132. The battery swapping cabinet 13 may also be provided with a plurality of charging compartments 133, and the charging compartments 133 may be used for accommodating batteries. The first management unit 131 may be a battery management unit arranged in the battery swapping cabinet 13, for example, the first management unit 131 may be referred to as a central battery management unit (CBMU). The first management unit 131 has a wireless communication function, and can establish a wireless communication connection with other units, modules, devices, etc. having a wireless communication function, and interact with other units, modules, devices, etc., having a wireless communication function via the wireless communication connection. The wireless communication function of the first management unit 131 may include a Bluetooth communication function, a WiFi communication function, a ZigBee communication function, etc., which is not limited herein. The charging unit(s) 132 can charge a battery in the charging compartments 133. In some examples, the charging unit may include a component, device, or apparatus having a charging function, such as an Alternating-Current/Direct-Current module (namely an AC/DC module), etc., which is not limited herein. The charging unit(s) 132 may be arranged in a one-to-one correspondence with the charging compartments 133, or multiple charging compartments 133 may share one charging unit 132, which is not limited herein.

The vehicle 12 may be detachably connected to a battery. In some examples, the vehicle 12 may be a vehicle that uses a power battery as a power source, such as a car, a truck, or the like.

The batteries may include a battery arranged in the vehicle 12 and a battery located in the battery swapping station 11 for battery swapping. The battery used for battery swapping in the battery swapping station 11 may be placed in the charging compartments 133 of the battery swapping cabinet 13 of the battery swapping station 11, which is not limited herein. For ease of distinction, as shown in FIG. 1, the battery to be replaced in the vehicle 12 is denoted as a battery 141, and the battery used for battery swapping in the battery swapping station is denoted as a battery 142.

The battery may be a lithium ion battery, a lithium metal battery, a lead-acid battery, a nickel cadmium battery, a nickel hydrogen battery, a lithium sulfur battery, a lithium air battery, or a sodium ion battery, etc., which is not limited herein. The battery may be a battery cell, a battery module or a battery pack, which is not limited herein. In addition to being used as a power source to supply power for a motor of the vehicle 12, the battery may also supply power for other electrical devices in the vehicle 12, for example, the battery may also supply power for an in-vehicle air conditioner, an on-board player, etc.

The battery may be provided with a second management unit 143 correspondingly. In some examples, the second management unit 143 may be a battery management unit corresponding to the battery. For example, the second management unit 143 may be referred to as a slave battery management unit (SBMU). The second management unit 143 has a wireless communication function, and can establish a wireless communication connection with other units, modules, devices, etc. having a wireless communication function, and interact with other units, modules, devices, etc., having a wireless communication function via the wireless communication connection. The wireless communication function of the second management unit 143 may include a Bluetooth communication function, a WiFi communication function, a ZigBee communication function, etc., which is not limited herein.

The battery swapping station 11 may also be provided with a management device correspondingly. The management device may be a centralized structure or a distributed structure, which is not limited herein. The management device may be arranged in the battery swapping station 11, or may be arranged outside the battery swapping station 11. Under a condition that the management device is a distributed structure, the management device may also be partly arranged in the battery swapping station 11 and partly arranged outside the battery swapping station 11. The management device may be implemented as an in-station computer and/or a remote server of the battery swapping station, which is not limited herein.

For example, as shown in FIG. 1, the management device may include an in-station computer 151 and a remote server 152. The in-station computer 151 may perform wired communication or wireless communication with the first management unit 131, which is not limited herein. The in-station computer 151 may acquire, through the first management unit 131 and the second management unit 143, information regarding a battery entering the battery swapping cabinet 13. The remote server 152 may communicate and interact with the in-station computer 151 to acquire information regarding the battery in the battery swapping cabinet 13 from the in-station computer 151.

As shown in FIG. 1, when the vehicle 12 enters the battery swapping station 11, the battery swapping station 11 may take out the battery 141 with insufficient power in the vehicle 12, and install the battery 142 with sufficient power in the battery swapping cabinet 13 of the battery swapping station 11 to the vehicle 12. After the battery 142 with sufficient power is installed to the vehicle 12, the vehicle 12 completes battery swapping and drives out of the battery swapping station 11. The battery 141 with insufficient power taken out from the vehicle 12 is placed in a charging compartment 133 of the battery swapping cabinet 13. The management device may acquire battery status information from the second management unit 143 of the battery through the first management unit 131 of the battery swapping cabinet 13 and transmit a charging instruction. The charging unit 132 of the battery swapping cabinet 13 may interact with the second management unit through the first management unit 131 to charge the battery. The embodiments of the present application can realize the automation of battery charging management in the battery swapping station 11, and can improve the efficiency of battery charging management in the battery swapping station.

A method for managing charging in a battery swapping station, a battery swapping cabinet and a system will be described below in sequence.

The first aspect of the present application provides a method for managing charging in a battery swapping station, which may be applied to a battery swapping cabinet. Specific contents of the battery swapping cabinet may refer to the above-mentioned relevant description, which will not be repeated herein. The following description will be given by taking, as an example, the battery in the vehicle as a battery pack. FIG. 2 is a flowchart of an embodiment of a method for managing charging in a battery swapping station provided by the present application. As shown in FIG. 2, the method for managing charging in a battery swapping station may include step S201 to step S204.

In step S201, the first management unit receives a wireless communication connection instruction transmitted by the management device of the battery swapping station.

The battery swapping station is provided with an information collection device. The information collection device may collect a vehicle identification of a vehicle and upload the vehicle identification to the management device in the battery swapping station. The management device stores a correspondence relationship between vehicle identifications and network location addresses of second management units of battery packs of vehicles. Under a condition that a vehicle enters the battery swapping station, the management device may determine a network location address of a second management unit of a battery pack of a vehicle that enters the battery swapping station for battery swapping, based on a vehicle identification collected by the information collection device and the correspondence relationship between vehicle identifications and network location addresses of second management units of battery packs of vehicles. The wireless communication connection instruction includes the network location address of the second management unit of the battery pack. That is, the management device may transmit the network location address of the second management unit of the battery pack to the first management unit through the wireless communication connection instruction.

In some examples, the management device may monitor an action of a battery pack entering the battery swapping cabinet, and when a battery pack enters the battery swapping cabinet, the management device may transmit a wireless communication connection instruction to the first management unit. That is, when it is monitored that a battery pack enters the battery swapping cabinet, the first management unit may receive a wireless communication connection instruction transmitted by the management device.

In step S202, the first management unit initiates a wireless communication connection to the second management unit based on the network location address of the second management unit.

The first management unit has a wireless communication function, and the second management unit also has a wireless communication function. After the first management unit acquires the network location address of the second management unit from the management device, the first management unit may use the network location address to initiate a wireless communication connection to the second management unit.

If after the first management unit initiates the wireless communication connection, the wireless communication connection with the second management unit is not successfully established after a timeout duration threshold is exceeded, then the wireless communication connection between the first management unit and the second management unit is considered to have failed.

In some examples, after a battery pack enters the battery swapping cabinet, if a second management unit of the battery pack still does not establish a wireless communication connection with other components, devices, apparatuses, etc. under a condition that a preset connection duration is exceeded, then the second management unit may enter a low-power consumption state to save power. The second management unit may also regularly switch from a low-power consumption state to a normal-operating state to avoid failure to establish a wireless communication connection with the first management unit in time.

In step S203, the first management unit uploads battery status information of the battery pack acquired from the second management unit to the management device.

Under a condition that the first management unit and the second management unit successfully establish a wireless communication connection, the second management unit may transmit the battery status information of the battery pack to the first management unit. The first management unit may upload the battery status information of the battery pack acquired from the second management unit to the management device.

In some examples, the first management unit may periodically or regularly receive the battery status information of the battery pack transmitted by the second management unit.

The battery status information of the battery pack may be used to characterize the battery pack and a status of the battery pack, and may be set based on scenarios, requirements, etc., which is not limited herein. In some examples, the battery status information may include a battery pack identification, status information, battery failure information, etc., which is not limited herein. The battery pack identification is used to identify the battery pack. The status information may include remaining power, a temperature, etc., which is not limited herein. The battery failure information may include information used to indicate whether the battery pack has failed, a type of failure, etc., which is not limited herein.

In step S204, under a condition that the first management unit receives a charging instruction transmitted by the management device based on the battery status information, the first management unit controls, via an interaction with the second management unit and the charging unit, the charging unit to charge the battery pack.

The management device receives the battery status information of the battery pack uploaded by the first management unit, and may determine whether the battery pack needs to be charged based on the battery status information and a charging condition stored by the management device. Under a condition that the battery status information satisfies the charging condition, the management device transmits a charging instruction to the first management unit. The charge instruction is to indicate to charge the battery pack.

The charging condition is a condition used to determine whether the battery pack needs to be charged, and may be set based on scenarios, requirements, etc., which is not limited herein. For example, the battery status information includes a state of charge (SOC), and the charging condition includes that the SOC of the battery pack is lower than a charging capacity threshold. If the SOC of the battery pack is lower than the charging capacity threshold, the management device transmits a charge instruction to the first management unit. For another example, the battery status information includes a battery pack voltage, and the charging condition includes that the battery pack voltage is lower than a charging voltage threshold. If the battery pack voltage is lower than the charging voltage threshold, the management device transmits a charging instruction to the first management unit.

Under a condition that the first management unit receives the charging instruction, the charging unit and the second management unit may interact through the first management unit to realize that the charging unit charges the battery pack. The second management unit may transmit information required for charging the battery pack to the first management unit, and the first management unit transmits the information required for charging the battery pack to the charging unit, to enable the charging unit to charge the battery pack.

In the embodiments of the present application, under a condition that a battery pack enters the battery swapping cabinet, the first management unit of the battery swapping cabinet can use the network location address of the second management unit of the battery pack transmitted by the management device, and can establish a wireless communication connection with the second management unit. Via a communication between the first management unit and the management device and a communication between the first management unit and the second management unit, the management device is enabled to acquire the battery status information of the battery pack. Via the communication between the first management unit and the second management unit and a communication between the first management unit and the charging unit, the interaction between the charging unit and the second management unit is realized, so that the charging unit can charge the battery pack corresponding to the second management unit. A charging management process of a battery pack in the battery swapping station does not require manual participation, and the charging management process can be automated, which improves the efficiency of charging management.

Moreover, in the embodiments of the present application, the first management unit of the battery swapping cabinet of the battery swapping station and the second management unit of the battery pack in the battery swapping cabinet are connected via wireless communication, and compared with a technical solution in which the battery swapping cabinet and the second management unit of the battery pack need to be connected through a wired connection, the embodiments of the present application can simplify a wiring structure in the battery swapping cabinet. For example, if 20 battery packs may be placed in the battery swapping cabinet, under a condition that the battery swapping cabinet is connected to second management units of battery packs through a wired connection, each battery pack needs to lead out more than 20 lines, then there will be more than 400 lines in the battery swapping cabinet, which has brought a great challenge to a line layout of the battery swapping cabinet and the battery swapping station. In the embodiments of the present application, more than 400 lines can be omitted, thereby simplifying the wiring structure of the battery swapping cabinet and the battery swapping station, and making it easier to maintain.

In some embodiments, the battery status information is periodically uploaded by the second management unit to the first management unit. Correspondingly, the first management unit periodically uploads the battery status information periodically transmitted by the second management unit to the management device. Specifically, the first management unit may forward the battery status information to the management device when receiving the battery status information transmitted by the second management unit, so that the management device can monitor the battery pack in time.

In some embodiments, under a condition that the management device instructs to charge the battery pack, the second management unit may interact with the charging unit through the first management unit. FIG. 3 is a flowchart of another embodiment of a method for managing charging in a battery swapping station provided by the present application. The difference between FIG. 3 and FIG. 2 is that step S204 in FIG. 2 may be specifically refined into step S2041 and step S2042, and the method for managing charging in a battery swapping station shown in FIG. 3 may further include step 205 or step 205 to step S208.

In step S2041, the first management unit forwards the charging instruction to the second management unit.

The first management unit forwards the charging instruction to the second management unit to notify the second management unit that the battery swapping station allows to charge the battery pack corresponding to the second management unit. In some examples, the charging instruction may include a battery pack identification, a charging cut-off condition, charging condition information, etc., which is not limited herein.

In step S2042, the first management unit transmits charging parameter information fed back by the second management unit to the charging unit, to enable the charging unit to charge the battery pack based on the charging parameter information.

The charging parameter information may be pre-stored in the second management unit. Under a condition that the second management unit receives the charging instruction, the second management unit may feed back the charging parameter information to the first management unit. In some examples, during a process of charging the battery pack by the charging unit, the second management unit may transmit the charging parameter information to the first management unit, and the first management unit forwards the received charging parameter information to the charging unit, to enable the charging unit to adjust a mode and current of charging the battery pack based on the charging parameter information in real time. Specifically, during the process of charging the battery pack by the charging unit, the second management unit may periodically or regularly transmit the charging parameter information to the first management unit. Correspondingly, the first management unit transmits the charging parameter information to the charging unit when receiving the charging parameter information transmitted by the second management unit, that is to say, the first management unit periodically or regularly transmits the charging parameter information to the charging unit.

The charging parameter information includes a charging parameter required for the process of charging the battery pack, which is not limited herein. In some examples, the charging parameter information may include a charging mode, a charging demand current, a charging cut-off voltage, and so on. The first management unit forwards the received charging parameter information to the charging unit. The charging unit receives the charging parameter information, and may charge the battery pack based on a charging parameter indicated by the charging parameter information. For example, the charging parameter information includes a charging mode and a charging demand current, wherein the charging mode is a constant-current and constant-voltage charging mode, the charging demand current of a constant-current charging stage is A1, and the charging demand current of a constant-voltage charging stage is A2, then the charging unit adopts a constant-current and constant-voltage charging mode, outputs a current A1 during a constant-current charging stage and outputs a current A2 during a constant-voltage charging stage, to charge the battery pack in the battery swapping cabinet. For another example, the charging parameter information includes a charging mode that is a pulse charging mode, and the charging parameter information also includes a charging demand current and a current duty ratio, wherein the charging demand current is A3 and the current duty ratio is k1, then the charging unit adopts a pulse charging mode and outputs a current A3 based on the current duty ratio k1, to charge the battery pack in the battery swapping cabinet.

The second management unit of the battery pack can transmit the charging parameter information to the charging unit through the first management unit of the battery swapping cabinet, so that the battery swapping cabinet can adaptively charge various types of battery packs, which improves the charging compatibility, flexibility and adaptability.

In step S205, under a condition that the second management unit monitors that the battery status information of the battery pack reaches a preset charging cut-off condition, the first management unit transmits stop-charging information fed back by the second management unit to the charging unit, to enable the charging unit to stop charging the battery pack.

In this example, the second management unit may autonomously initiate a request to stop charging. The second management unit may acquire the battery status information of the battery pack in real time, and under a condition that the second management unit monitors that the battery status information of the battery pack reaches a preset charging cut-off condition, the second management unit may transmit stop-charging information to the first management unit. The first management unit transmits the stop-charging information to the charging unit. The stop-charging information is used to indicate to stop charging the battery pack. In some examples, the stop-charging information may include a charging demand current with a value of 0, and under a condition that the battery status information of the battery pack reaches the preset charging cut-off condition, the second management unit transmits the stop-charging information including a charging demand current with a value of 0 to the first management unit, the first management unit transmits the stop-charging information to the charging unit, and the charging unit stops charging the battery pack.

The charging cut-off condition may be stored in the second management unit. The charging cut-off condition may be set based on types of battery packs, application scenarios, requirements, etc., which is not limited herein. For example, the charging cut-off condition is that a battery pack voltage reaches a full charge voltage threshold, and under a condition that the battery pack voltage acquired by the second management unit reaches the full charge voltage threshold, the second management unit transmits the stop-charging information to the first management unit, the first management unit transmits the stop-charging information to the charging unit, and the charging unit stops charging the battery pack in response to the stop-charging information, that is, stops outputting a charging current to the battery pack.

The second management unit of the battery pack performs real-time monitoring of the battery pack, and under a condition that the battery pack status information reaches a charging cut-off condition, the first management unit actively initiates, to the charging unit, a request to stop charging, which can realize the automation of the entire charging process, improve the efficiency of charging management, and can stop charging in time to prevent the battery from overcharging and ensure the safety of the battery pack.

In step S206, the first management unit uploads the battery status information of the battery pack acquired from the second management unit to the management device.

In this example, the management device initiates a request to stop charging. During the process of charging the battery pack by the charging unit, the second management unit may regularly or periodically transmit the battery status information of the battery pack to the first management unit, so that the first management unit may regularly or periodically transmit the battery status information of the battery pack to the management device to realize the monitoring of the battery pack by the management device. Specific contents of the battery status information of the battery pack may refer to relevant description in the above-mentioned embodiments, which will not be repeated herein.

In step S207, under a condition that the management device determines that the battery status information reaches the preset charging cut-off condition, the first management unit forwards a stop-charging instruction transmitted by the management device to the second management unit.

The charging cut-off condition may be stored in the management device, and under a condition that the management device determines that the battery status information reaches the charging cut-off condition, the management device may transmit a stop-charging instruction to the first management unit. The first management unit forwards the stop-charging instruction to the second management unit when receiving the stop-charging instruction. The stop-charging instruction is used to instruct to stop charging the battery pack. Specific contents of the battery status information reaching the charging cut-off condition may refer to relevant description in the above-mentioned embodiments, which will not be repeated herein.

In step S208, the first management unit transmits to the charging unit stop-charging information fed back by the second management unit, to enable the charging unit to stop charging the battery pack.

Upon receiving the stop-charging instruction, the second management unit may feed back the stop-charging information to the first management unit, and the first management unit transmits the stop-charging information to the charging unit. The charging unit receives the stop-charging information and stops charging the battery pack. Specific contents of the stop-charging information may refer to relevant description in the above-mentioned embodiments, which will not be repeated herein.

The management device acquires the battery status information of the battery pack from the second management unit of the battery pack through the first management unit of the battery swapping cabinet, to realize real-time monitoring of the battery pack. Under a condition that the battery pack status information reaches a charging cut-off condition, the management device initiates a request to stop charging, instructs the second management unit to stop charging through the first management unit, and the second management unit interacts with the charging unit through the first management unit, to enable the charging unit to stop charging the battery pack. The automation of the entire charging process is realized, the efficiency of charging management is improved, and the charging can be stopped in time to prevent a battery from overcharging and ensure the safety of a battery pack.

Figure 4:
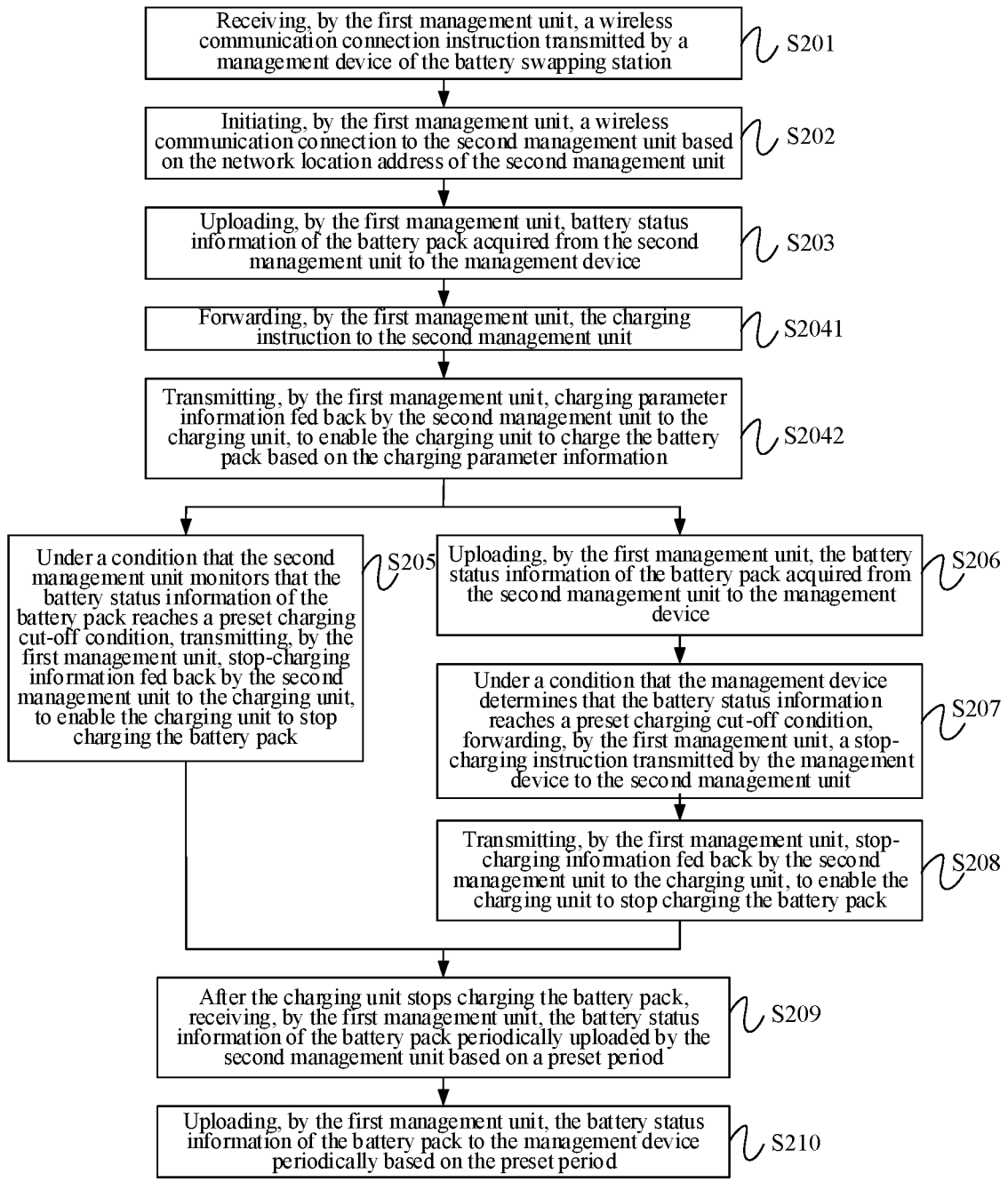
FIG. 4 is a flowchart of yet another embodiment of a method for managing charging in a battery swapping station provided by the present application.

In some embodiments, after the charging of the battery pack is completed, the battery status information of the battery pack may continue to be monitored. FIG. 4 is a flowchart of yet another embodiment of a method for managing charging in a battery swapping station provided by the present application. The difference between FIG. 4 and FIG. 3 is that the method for managing charging in a battery swapping station shown in FIG. 4 may further include step S209 and step S210.

In step S209, after the charging unit stops charging the battery pack, the first management unit receives the battery status information of the battery pack periodically uploaded by the second management unit based on a preset period.

In step S210, the first management unit periodically uploads the battery status information of the battery pack to the management device based on the preset period.

After the charging of the battery pack is completed, the status of the battery pack will change over time, and the battery status information of the battery pack still needs to be detected. The second management unit may periodically transmit the battery status information of the battery pack to the first management unit based on a preset period. The first management unit may upload the battery status information to the management device when receiving the battery status information of the battery pack transmitted by the second management unit.

The preset period may be set based on scenarios, requirements, experience, etc., which is not limited herein. For different time periods, different preset periods may be set. In some examples, the preset period includes a first preset period and a second preset period, and the first preset period is shorter than the second preset period. The first preset period and the second preset period may be set based on scenarios, requirements, experience, etc., which are not limited herein. For example, the first preset period is 1 second, and the second preset period is 30 minutes.

Within a preset time period after the charging unit stops charging the battery pack, the first management unit periodically uploads the battery pack status information of the battery pack to the management device based on the first preset period. After the preset time period ends, the first management unit periodically uploads the battery pack status information of the battery pack to the management device based on the second preset period. The duration of the preset time period is longer than or equal to the duration required for depolarization of the battery pack after charging. Since there is a depolarization phenomenon for the battery pack and thus the battery pack is in an unstable state during the preset time period after the charging unit stops charging the battery pack, frequent monitoring is required. The battery status information of the battery pack is monitored based on the first preset period, to ensure that an abnormality of the battery pack is found in time. After the preset time period ends, the depolarization phenomenon of the battery pack ends and the battery pack is in a stable state, frequent monitoring is not needed. The battery status information of the battery pack may be monitored based on the second preset period.

The management device acquires, through the first management unit, the battery status information of the battery pack acquired from the second management unit, to realize the monitoring of the battery pack after the charging is completed, which improves the safety and reliability of the battery swapping station. By setting the first preset period and the second preset period, the battery status information is frequently acquired under a condition that the battery pack is unstable, which ensures the safety of the battery swapping station, and the battery status information is no longer frequently acquired under a condition that the battery pack is stable, which can save resources and avoid acquiring a large amount of redundant data, thereby achieving a balance between the safety of the battery swapping station and data redundancy.

Figure 5:
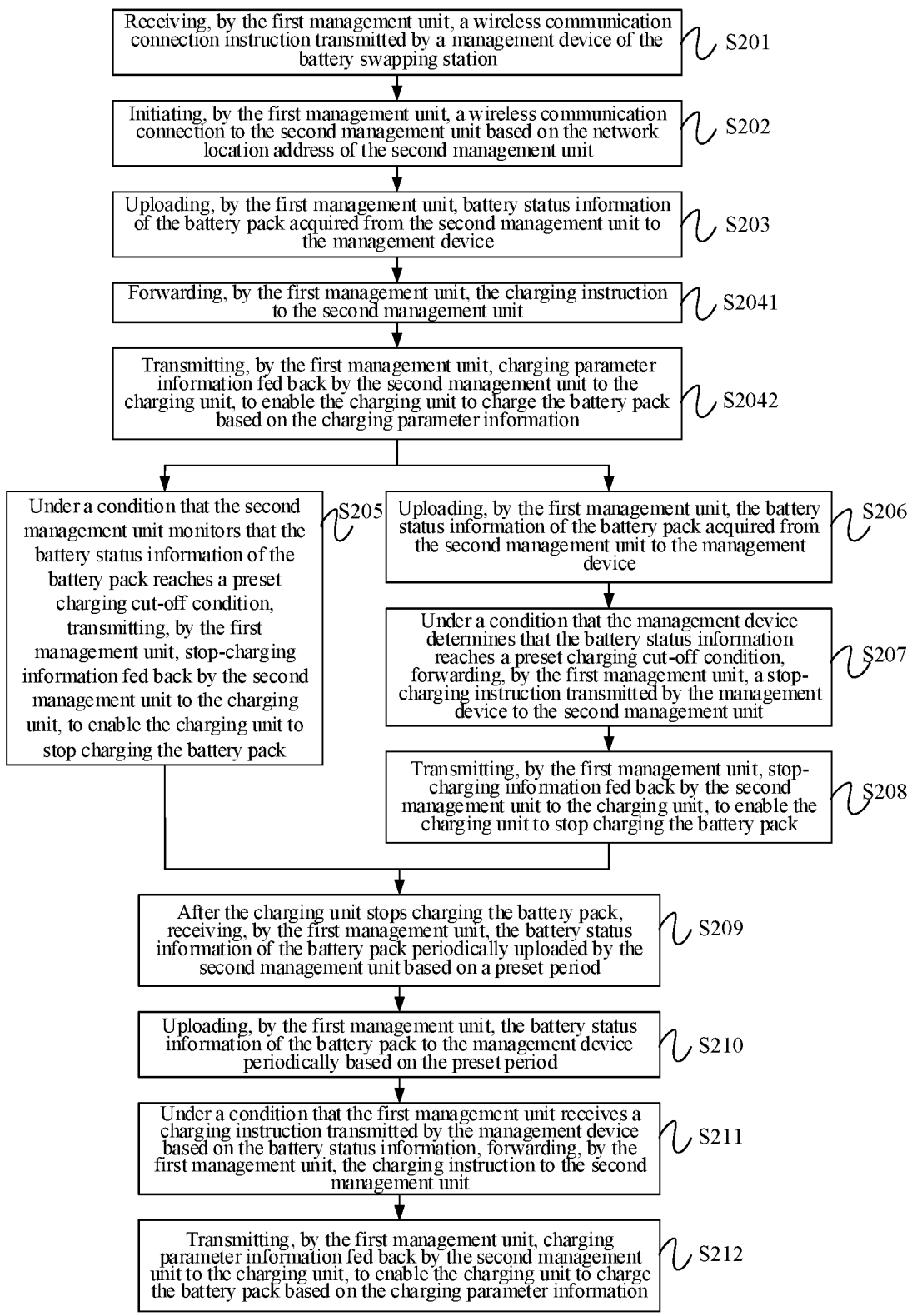
FIG. 5 is a flowchart of still another embodiment of a method for managing charging in a battery swapping station provided by the present application.

In some embodiments, the status of the battery pack after charging in the battery swapping cabinet will change over time. When the battery pack needs to be charged again, the management device may initiate a charging request again through the first management unit. FIG. 5 is a flowchart of still another embodiment of a method for managing charging in a battery swapping station provided by the present application. The difference between FIG. 5 and FIG. 4 is that the method for managing charging in a battery swapping station shown in FIG. 5 may further include step S211 and step S212.

In step S211, under a condition that the first management unit receives the charging instruction transmitted by the management device based on the battery status information, the first management unit forwards the charging instruction to the second management unit.

After the charging of the battery pack is completed, the second management unit still maintains monitoring of the battery pack, and transmits the acquired battery status information of the battery pack to the first management unit, and the first management unit uploads the received battery status information to the management device. The management device may determine whether the battery pack needs to be charged based on the battery status information and a charging condition stored by the management device. Under a condition that the battery status information satisfies the charging condition, the management device transmits a charging instruction to the first management unit, and the first management unit forwards the charging instruction to the second management unit.

In step S212, the first management unit transmits the charging parameter information fed back by the second management unit to the charging unit, to enable the charging unit to charge the battery pack based on the charging parameter information.

The second management unit receives the charging instruction transmitted by the first management unit, and feeds back the charging parameter information to the first management unit. The first management unit transmits the charging parameter information to the charging unit. The charging unit receives the charging parameter information, and may charge the battery pack based on the charging parameter information.

Specific contents such as charging parameter information, a charging condition, etc. may refer to relevant description in the above-mentioned embodiments, which is not repeated herein.

After the charging is completed, a status of the battery pack in the battery swapping cabinet will change over time, and there will be power loss. After the charging is completed, if it is detected that the battery pack needs to be charged, the battery pack is recharged, to avoid a situation that power of a battery in the battery swapping cabinet is insufficient when the battery in the battery swapping cabinet needs to be used for battery swapping of a vehicle, so that reliability of battery swapping of the battery swapping station can be improved.

Figure 6:
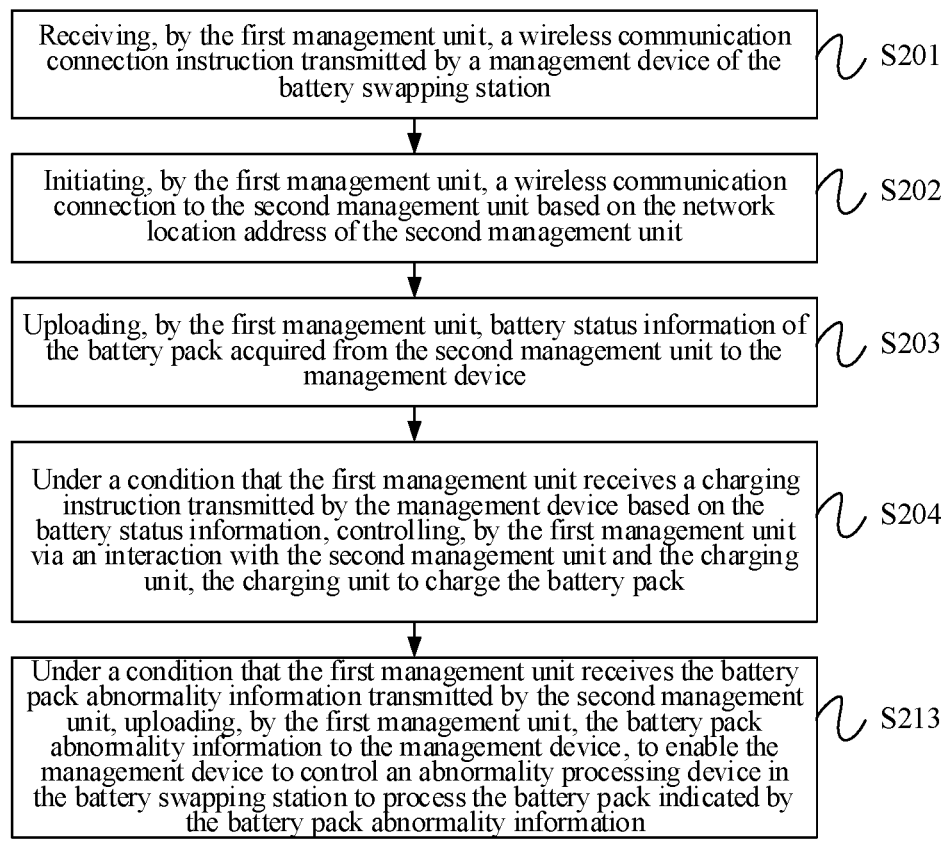
FIG. 6 is a flowchart of still another embodiment of a method for managing charging in a battery swapping station provided by the present application.

In some embodiments, the first management unit may also upload battery pack abnormality information to the management device in time, so that the management device can take measures for abnormalities in time to ensure the safety of the battery swapping station. FIG. 6 is a flowchart of still another embodiment of a method for managing charging in a battery swapping station provided by the present application. The difference between FIG. 6 and FIG. 2 is that the method for managing charging in a battery swapping station shown in FIG. 6 may further include step S213.

In step S213, under a condition that the first management unit receives the battery pack abnormality information transmitted by the second management unit, the first management unit uploads the battery pack abnormality information to the management device, so that the management device controls an abnormality processing device in the battery swapping station to process the battery pack indicated by the battery pack abnormality information.

Generation of the battery pack abnormality information is trigged when the second management unit detects that the battery pack is abnormal. The second management unit monitors the battery pack in real time. When an abnormality occurs in the battery pack, the second management unit may generate battery pack abnormality information correspondingly and transmit it to the first management unit. The battery pack abnormality information is used to characterize that an abnormality occurs in the battery pack. Different abnormal conditions may correspond to different battery pack abnormality information, which is not limited herein.

The first management unit receives the battery pack abnormality information, and uploads the battery pack abnormality information to the management device. The management device may transmit a control instruction to the abnormality processing device of the battery swapping station based on the battery pack abnormality information, and control the abnormality processing device to process the abnormal battery pack in the battery swapping cabinet.

In some examples, upon receiving the battery pack abnormality information, the management device may control the abnormality processing device to take out, from the battery swapping cabinet, the abnormal battery pack in the battery swapping cabinet and discard it.

In other examples, an abnormality-monitoring area 150 (shown in FIG. 1) may be set at the battery swapping station. The management device determines a battery pack (e.g., the battery 142) being abnormal in the battery swapping cabinet based on the battery pack status information, and controls the abnormality processing device of the battery swapping station to take out the battery pack from the battery swapping cabinet and transfer it to the abnormality-monitoring area 150. At this time, the second management unit of the battery pack still maintains a wireless communication connection with the first management unit, and the first management unit may continue to acquire the battery status information of the battery pack from the second management unit, and upload the acquired battery status information of the battery pack to the management device. If the management device determines based on the battery pack status information, that the battery pack located in the abnormality-monitoring area 150 returns to normal within a preset monitoring period, the battery pack may be kept, for example, the abnormality processing device may be controlled to transfer the battery pack from the abnormality-monitoring area 150 back to the battery swapping cabinet. If the management device determines based on the battery pack status information, that the battery pack located in the abnormality-monitoring area 150 continues to be abnormal within the preset monitoring period, the abnormality processing device may be controlled to discard the battery pack.

Step S213 may also be performed after step S209 and/or step S210, and the sequence of step S213 and other steps is not limited herein.

The battery pack abnormality information acquired from the second management unit is transmitted by the first management unit to the management device of the battery swapping station, so that the management device can take safety measures in time to ensure the safety and reliability of the battery swapping station. By observing abnormal battery packs in the abnormality-monitoring area, safer battery packs can be kept, which avoids discarding a large number of battery packs, and improves a resource utilization of battery packs.

Figure 7:
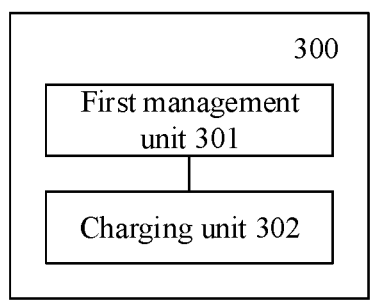
FIG. 7 is a schematic structural diagram of an embodiment of a battery swapping cabinet provided by the present application.

The second aspect of the present application provides a battery swapping cabinet. FIG. 7 is a schematic structural diagram of an embodiment of a battery swapping cabinet provided by the present application. As shown in FIG. 7, the battery swapping cabinet 300 may include a first management unit 301 and a charging unit 302.

The first management unit 301 has a wireless communication function, and may be configured to: under a condition that a battery pack enters the battery swapping cabinet, receive a wireless communication connection instruction transmitted by a management device in a battery swapping station, wherein the wireless communication connection instruction includes a network location address of a second management unit of the battery pack; initiate a wireless communication connection to the second management unit based on the network location address of the second management unit; upload battery status information of the battery pack acquired from the second management unit to the management device; and under a condition that a charging instruction transmitted by the management device based on the battery status information is received, control the charging unit 302 to charge the battery pack, via an interaction with the second management unit and the charging unit 302;

The charging unit 302 may be configured to interact with the second management unit through the first management unit to charge the battery pack.

In the embodiments of the present application, under a condition that a battery pack enters the battery swapping cabinet, the first management unit of the battery swapping cabinet can use the network location address of the second management unit of the battery pack transmitted by the management device, and can establish a wireless communication connection with the second management unit. Via a communication between the first management unit and the management device and a communication between the first management unit and the second management unit, the management device is enabled to acquire the battery status information of the battery pack. Via the communication between the first management unit and the second management unit and a communication between the first management unit and the charging unit, the interaction between the charging unit and the second management unit is realized, so that the charging unit can charge the battery pack corresponding to the second management unit. A charging management process of a battery pack in the battery swapping station does not require manual participation, and the charging management process can be automated, which improves the efficiency of charging management.

Moreover, in the embodiments of the present application, the first management unit of the battery swapping cabinet of the battery swapping station and the second management unit of the battery pack in the battery swapping cabinet are connected via wireless communication, and compared with a technical solution in which the battery swapping cabinet and the second management unit of the battery pack need to be connected through a wired connection, the embodiments of the present application can simplify a wiring structure in the battery swapping cabinet.

In some embodiments, the battery status information is periodically uploaded by the second management unit to the first management unit 301.

In some embodiments, the first management unit 301 may be configured to: forward the charging instruction to the second management unit; transmit charging parameter information fed back by the second management unit to the charging unit, to enable the charging unit 302 to charge the battery pack based on the charging parameter information.

The charging unit 302 may be configured to receive the charging parameter information transmitted by the first management unit 301, and charge the battery pack based on the charging parameter information.

In some embodiments, the first management unit 302 is further configured to: after controlling, by the first management unit 301 via an interaction with the second management unit and the charging unit 302, the charging unit 302 to charge the battery pack, under a condition that the second management unit monitors that the battery status information of the battery pack reaches a preset charging cut-off condition, transmit stop-charging information fed back by the second management unit to the charging unit 302, to enable the charging unit 302 to stop charging the battery pack.

In some embodiments, the first management unit 302 is further configured to: after controlling, by the first management unit 301 via an interaction with the second management unit and the charging unit 302, the charging unit 302 to charge the battery pack, upload the battery status information of the battery pack acquired from the second management unit to the management device; forward a stop-charging instruction transmitted by the management device to the second management unit; and transmit stop-charging information fed back by the second management unit to the charging unit, to enable the charging unit 302 to stop charging the battery pack.

In some embodiments, the first management unit 302 is further configured to: after the charging unit stops charging the battery pack, receive the battery status information of the battery pack periodically uploaded by the second management unit based on a preset period; and upload the battery status information of the battery pack to the management device periodically based on the preset period.

In some embodiments, the preset period includes a first preset period and a second preset period, and the first preset period is shorter than the second preset period.

The first management unit 302 is configured to: within a preset time period after the charging unit 302 stops charging the battery pack, upload the battery status information of the battery pack to the management device periodically based on the first preset period; and after the preset time period ends, upload the battery status information of the battery pack to the management device periodically based on the second preset period.

In some embodiments, the first management unit 302 is further configured to: after uploading, by the first management unit 301, the battery status information of the battery pack to the management device periodically based on the preset period, under a condition that the first management unit receives a charging instruction transmitted by the management device based on the battery status information, forward the charging instruction to the second management unit; and transmit charging parameter information fed back by the second management unit to the charging unit 302, to enable the charging unit 302 to charge the battery pack based on the charging parameter information.

In some embodiments, the battery status information includes battery pack abnormality information.

The first management unit 302 is further configured to: under a condition that the battery pack abnormality information transmitted by the second management unit is received, upload the battery pack abnormality information to the management device, to enable the management device to control an abnormality processing device in the battery swapping station to process the battery pack indicated by the battery pack abnormality information.

Generation of the battery pack abnormality information is trigged when the second management unit detects that the battery pack is abnormal.

The third aspect of the present application provides a system for managing charging in a battery swapping station. The system for managing charging in a battery swapping station includes the management device, the battery swapping cabinet and the second management unit in the above-mentioned embodiments. The battery swapping cabinet includes the first management unit and the charging unit in the above-mentioned embodiments.

The management device is arranged to correspond to the battery swapping station, and is configured to: under a condition that a battery pack enters the battery swapping cabinet, transmit a wireless communication connection instruction to the first management unit.

The wireless communication connection instruction includes a network location address of the second management unit.

The first management unit is configured to receive the wireless communication connection instruction, and initiate a wireless communication connection to the second management unit based on the network location address of the second management unit.

The second management unit is configured to transmit battery status information of the battery pack to the first management unit.

The first management unit is further configured to upload the battery status information to the management device.

The management device is further configured to transmit a charging instruction to the first management unit based on the battery status information.

The first management unit is further configured to: under a condition that the charging instruction is received, control the charging unit to charge the battery pack, via an interaction with the second management unit and the charging unit.

The charging unit is configured to interact with the second management unit through the first management unit to charge the battery pack.

Specific contents such as the management device, the first management unit in the battery swapping cabinet, the charging unit in the battery swapping cabinet, and the second management unit of the battery pack may refer to relevant description in the above-mentioned embodiments, which will not be repeated herein.

It should be clear that various embodiments in the specification are described in a progressive manner, and same or similar parts among various embodiments may be referred to each other. Each embodiment focuses on differences from other embodiments. Regarding embodiments of the battery swapping cabinet and the system, related parts may refer to description of the embodiments of the method.

Various aspects of the present application are described above with reference to flowcharts and/or block diagrams of the methods, devices (systems) and computer program products according to the embodiments of the present application. It should be understood that each block in the flowcharts and/or block diagrams and a combination of blocks in the flowcharts and/or block diagrams can be implemented by computer program instructions. These computer program instructions can be provided to a processor of a general-purpose computer, a special-purpose computer, or other programmable data processing device to produce a machine that cause these instructions executed via a processor of a computer or other programmable data processing device to enable realization of functions/actions specified in one or more blocks of the flowcharts and/or block diagrams. Such a processor can be, but is not limited to, a general-purpose processor, a dedicated processor, a special application processor, or a field programmable logic circuit. It can also be understood that each block in the block diagrams and/or flowcharts and a combination of blocks in the block diagrams and/or flowcharts can also be implemented by dedicated hardware that performs a specified function or action, or can be implemented by a combination of dedicated hardware and computer instructions.

Although the present application has been described with reference to preferred embodiments, various modifications may be made thereto and components thereof may be replaced with their equivalents, without departing from the scope of the present application. In particular, as long as there is no structural conflict, various technical features mentioned in various embodiments can be combined in any manner. The present application is not limited to the specific embodiments disclosed herein, and instead, includes all the technical solutions that fall within the scope of the claims.

What is claimed is:

1. A method for managing charging in a battery swapping station, applied to a battery swapping cabinet in the battery swapping station, wherein the battery swapping cabinet comprises a first management unit and a charging unit, the first management unit has a wireless communication function, and the method comprises:
   determining, by a management device of the swapping station, that a battery pack corresponds to a second management unit after the battery pack enters the battery swapping station;
   receiving, by the first management unit, a wireless communication connection instruction transmitted by the management device of the battery swapping station, wherein the wireless communication connection instruction comprises a network location address of the second management unit;
   initiating, by the first management unit, a wireless communication connection to the second management unit based on the network location address of the second management unit;
   uploading, by the first management unit, battery status information of the battery pack acquired from the second management unit to the management device;
   under a condition that the first management unit receives a charging instruction transmitted by the management device based on the battery status information, controlling, by the first management unit via an interaction with the second management unit and the charging unit, the charging unit to charge the battery pack, wherein controlling the charging unit to charge the battery pack further comprises:
      forwarding, by the first management unit, the charging instruction to the second management unit; and
      transmitting, by the first management unit, charging parameter information provided by the second management unit to the charging unit, to enable the charging unit to charge the battery pack based on the charging parameter information,
      wherein the charging parameter information comprises a charging mode and a charging demand current, and the charging mode to output the charge demand current are adopted by the charging unit to charge the battery pack;
   after the charging unit stops charging the battery pack, receiving, by the first management unit, the battery status information of the battery pack periodically uploaded by the second management unit based on a preset period;
   uploading, by the first management unit, the battery status information of the battery pack to the management device periodically based on the preset period;
   monitoring, by the second management unit, the battery pack in real time;
   generating, by the second management unit, battery pack abnormality information when an abnormality occurs in the battery pack;
   receiving, by the first management unit, the battery pack abnormality information transmitted by the second management unit; and
   uploading, by the first management unit, the battery pack abnormality information to the management device, to enable the management device to control an abnormality processing device in the battery swapping station to:
      take out the battery pack indicated by the battery pack abnormality information from the battery swapping cabinet; and
      transfer the battery pack indicated by the battery pack abnormality information to an abnormality-monitoring area set at the battery swapping station,
      wherein under a condition that the management device determines based on the battery status information, that the battery pack located in the abnormality-monitoring area returns to normal within a preset monitoring period, the abnormality processing device is controlled to transfer the battery pack from the abnormality-monitoring area back to the battery swapping cabinet, and under a condition that the management device determines based on the battery status information, that the battery pack located in the abnormality-monitoring area continues to be abnormal within the preset monitoring period, the abnormality processing device is controlled to discard the battery pack.

2. The method of claim 1, wherein the battery status information is periodically uploaded by the second management unit to the first management unit.

3. The method of claim 1, wherein after the controlling, by the first management unit via an interaction with the second management unit and the charging unit, the charging unit to charge the battery pack, the method further comprises:
   under a condition that the second management unit monitors that the battery status information of the battery pack reaches a preset charging cut-off condition, transmitting, by the first management unit, stop-charging information provided by the second management unit to the charging unit, to enable the charging unit to stop charging the battery pack.

4. The method of claim 1, wherein the preset period comprises a first preset period and a second preset period, and the first preset period is shorter than the second preset period,
   the uploading, by the first management unit, the battery status information of the battery pack to the management device periodically based on the preset period comprises:
   within a preset time period after the charging unit stops charging the battery pack, uploading, by the first management unit, the battery status information of the battery pack to the management device periodically based on the first preset period; and
   after the preset time period ends, uploading, by the first management unit, the battery status information of the battery pack to the management device periodically based on the second preset period.

5. The method of claim 1, wherein after uploading, by the first management unit, the battery status information of the battery pack to the management device periodically based on the preset period, the method further comprises:
   under a condition that the first management unit receives a charging instruction transmitted by the management device based on the battery status information, forwarding, by the first management unit, the charging instruction to the second management unit; and transmitting, by the first management unit, charging parameter information provided by the second management unit to the charging unit, to enable the charging unit to charge the battery pack based on the charging parameter information.

6. The method of claim 1, wherein after the controlling, by the first management unit via an interaction with the second management unit and the charging unit, the charging unit to charge the battery pack, the method further comprises: uploading, by the first management unit, the battery status information of the battery pack acquired from the second management unit to the management device; under a condition that the management device determines that the battery status information reaches a preset charging cut-off condition, forwarding, by the first management unit, a stop-charging instruction transmitted by the management device to the second management unit; and transmitting, by the first management unit, stop-charging information fed back by the second management unit to the charging unit, to enable the charging unit to stop charging the battery pack.

7. The method of claim 1, wherein the charging mode is a constant-current and constant-voltage charging mode, the charging demand current of a constant-current charging stage is A1, and the charging demand current of a constant-voltage charging stage is A2, the current A1 is output by the charging unit during a constant-current charging stage, and the current A2 is output by the charging unit during a constant-voltage charging stage.

8. The method of claim 1, wherein the charging mode is a pulse charging mode, and the charging parameter information further comprises a current duty ratio, the charging demand current is A3, the current duty ratio is k1, the current A3 is output by the charging unit based on the current duty ratio k1 to charge the battery pack.

9. A battery swapping cabinet in a battery swapping station, the battery swapping cabinet comprising: a first management unit and a charging unit,
wherein the first management unit has a wireless communication function and is configured to:
under a condition that a battery pack enters the battery swapping cabinet, receive a wireless communication connection instruction transmitted by a management device in communication with the first management unit, wherein the battery pack corresponds to a second management unit based on a determination made by the management device, wherein the wireless communication connection instruction comprises a network location address of the second management unit of the battery pack;
initiate a wireless communication connection to the second management unit based on the network location address of the second management unit;
upload battery status information of the battery pack acquired from the second management unit to the management device; and
under a condition that a charging instruction transmitted by the management device based on the battery status information is received, control a charging unit to charge the battery pack, via an interaction with the second management unit and the charging unit, wherein the first management unit is further configured to forward the charging instruction to the second management unit and transmit charging parameter information provided by the second management unit to the charging unit to enable the charging unit to charge the battery pack based on the charging parameter information, wherein the charging parameter information comprises a charging mode and a charging demand current; and
wherein the charging unit is configured to interact with the second management unit through the first management unit and charge the battery pack according to the charging parameter information,
wherein the first management unit is further configured to:
after the charging unit stops charging the battery pack, receive the battery status information of the battery pack periodically uploaded by the second management unit based on a preset period; and
upload the battery status information of the battery pack to the management device periodically based on the preset period,
wherein the first management unit is further configured to:
receive battery pack abnormality information transmitted by the second management unit, wherein the battery pack is monitored by the second management unit in real time, and the battery pack abnormality information is generated by the second management unit when the second management unit detects that the battery pack is abnormal;
upload the battery pack abnormality information to the management device to enable the management device to control an abnormality processing device in the battery swapping station to:
process the battery pack indicated by the battery pack abnormality information;
take out the battery pack indicated by the battery pack abnormality information from the battery swapping cabinet; and
transfer the battery pack indicated by the battery pack abnormality information to an abnormality-monitoring area set at the battery swapping station,
wherein under a condition that the management device determines based on the battery status information, that the battery pack located in the abnormality-monitoring area returns to normal within a preset monitoring period, the abnormality processing device is controlled to transfer the battery pack from the abnormality-monitoring area back to the battery swapping cabinet, and under a condition that the management device determines based on the battery status information, that the battery pack located in the abnormality-monitoring area continues to be abnormal within the preset monitoring period, the abnormality processing device is controlled to discard the battery pack.

10. The battery swapping cabinet of claim 9, wherein the charging mode is a constant-current and constant-voltage charging mode, the charging demand current of a constant-current charging stage is A1, and the charging demand current of a constant-voltage charging stage is A2, the charging unit is configured to output the current A1 during a constant-current charging stage and output the current A2 during a constant-voltage charging stage.

11. The battery swapping cabinet of claim 9, wherein the charging mode is a pulse charging mode, and the charging parameter information further comprises a current duty ratio, the charging demand current is A3, the current duty ratio is k1, the charging unit is configured to output the current A3 based on the current duty ratio k1 to charge the battery pack.

12. A system for managing charging in a battery swapping station, comprising a management device, a battery swapping cabinet and a second management unit, wherein the battery swapping cabinet comprises a first management unit and a charging unit,
- wherein the management device is arranged to correspond to the battery swapping station, and is configured to: determine that a battery pack corresponds to a second management unit in response to a battery pack entering the battery swapping station and transmit a wireless communication connection instruction to the first management unit, wherein the wireless communication connection instruction comprises a network location address of the second management unit;
- the first management unit is configured to receive the wireless communication connection instruction, and initiate a wireless communication connection to the second management unit based on the network location address of the second management unit;
- the second management unit is configured to transmit battery status information of the battery pack to the first management unit;
- the first management unit is further configured to upload the battery status information to the management device;
- the management device is further configured to transmit a charging instruction to the first management unit based on the battery status information;
- the first management unit is further configured to: under a condition that the charging instruction is received, control the charging unit to charge the battery pack, via an interaction with the second management unit and the charging unit, wherein the first management unit is further configured to: forward the charging instruction to the second management unit and transmit charging parameter information provided by the second management unit to the charging unit to enable the charging unit to charge the battery pack based on the charging parameter information, wherein the charging parameter information comprises a charging mode and a charging demand current; and
- the charging unit is configured to interact with the second management unit through the first management unit and charge the battery pack according to the charging parameter information,
- the first management unit is further configured to:
  - after the charging unit stops charging the battery pack, receive the battery status information of the battery pack periodically uploaded by the second management unit based on a preset period; and
  - upload the battery status information of the battery pack to the management device periodically based on the preset period,
- the second management unit is further configured to:
  - monitor the battery pack in real time;
  - generate battery pack abnormality information when an abnormality occurs in the battery pack; and
  - transmit the battery pack abnormality information to the first management unit, the first management device is further configured to:
- upload the battery pack abnormality information to the management device to enable the management device to control an abnormality processing device in the battery swapping station to:
  - take out the battery pack indicated by the battery pack abnormality information from the battery swapping cabinet; and
  - transfer the battery pack indicated by the battery pack abnormality information to an abnormality-monitoring area set at the battery swapping station,
  - wherein under a condition that the management device determines based on the battery status information, that the battery pack located in the abnormality-monitoring area returns to normal within a preset monitoring period, the abnormality processing device is controlled to transfer the battery pack from the abnormality-monitoring area back to the battery swapping cabinet, and under a condition that the management device determines based on the battery status information, that the battery pack located in the abnormality-monitoring area continues to be abnormal within the preset monitoring period, the abnormality processing device is controlled to discard the battery pack.

13. The system of claim 12, wherein the charging mode is a constant-current and constant-voltage charging mode, the charging demand current of a constant-current charging stage is A1, and the charging demand current of a constant-voltage charging stage is A2, the charging unit is configured to output the current A1 during a constant-current charging stage and output the current A2 during a constant-voltage charging stage.

14. The system of claim 12, wherein the charging mode is a pulse charging mode, and the charging parameter information further comprises a current duty ratio, the charging demand current is A3, the current duty ratio is k1, the charging unit is configured to output the current A3 based on the current duty ratio k1 to charge the battery pack.

* * * * *